US008287419B2

(12) United States Patent
Chang

(10) Patent No.: US 8,287,419 B2
(45) Date of Patent: Oct. 16, 2012

(54) ASYMMETRIC PLANETARY DRIVE ASSEMBLY FOR USE IN SHAKERS

(75) Inventor: Lingo Chang, Missouri City, TX (US)

(73) Assignee: Kem-Tron Technologies, Inc., Stafford, TX (US)

( * ) Notice: Subject to any disclaimer, the term of this patent is extended or adjusted under 35 U.S.C. 154(b) by 0 days.

(21) Appl. No.: 12/881,971

(22) Filed: Sep. 14, 2010

(65) Prior Publication Data

US 2011/0272332 A1 Nov. 10, 2011

Related U.S. Application Data

(60) Provisional application No. 61/331,196, filed on May 4, 2010.

(51) Int. Cl.
*F16H 3/74* (2006.01)

(52) U.S. Cl. .......................................... 475/255; 475/267

(58) Field of Classification Search .................. 475/255, 475/267

See application file for complete search history.

(56) References Cited

U.S. PATENT DOCUMENTS

| | | | | |
|---|---|---|---|---|
| 1,741,857 A * | 12/1929 | Lyman et al. | .................. | 475/255 |
| 1,810,282 A * | 6/1931 | Ljungstrom | ...................... | 74/64 |
| 2,123,685 A | 7/1938 | Sloane | | |
| 2,132,221 A * | 10/1938 | Ruliancich | .................... | 475/255 |
| 4,019,626 A | 4/1977 | Kamner | | |
| 5,385,669 A | 1/1995 | Leone | | |
| 5,853,583 A | 12/1998 | Shah | | |
| 5,910,066 A | 6/1999 | Schulz et al. | | |
| 7,571,817 B2 * | 8/2009 | Scott et al. | ..................... | 209/413 |
| 7,581,647 B2 * | 9/2009 | Grichar et al. | ................ | 209/370 |
| 2003/0201237 A1 | 10/2003 | Grichar et al. | | |
| 2006/0006764 A1 | 1/2006 | Ganor et al. | | |

FOREIGN PATENT DOCUMENTS

| | | | |
|---|---|---|---|
| JP | 061379996 A | 5/1994 | |
| JP | 7068683 B2 | 7/1995 | |

OTHER PUBLICATIONS

Written Opinion and Search Report for International Application No. PCT/US2010/055600, dated Jun. 3, 2011, 15 pages.

* cited by examiner

*Primary Examiner* — Tisha Lewis
(74) *Attorney, Agent, or Firm* — Connley Rose, P.C.

(57) ABSTRACT

A shale shaker comprises a base and at least one deck coupled to the base. The deck is configured to support a mud screen. The shake also comprises a support frame coupled to the base and further includes an asymmetric planetary drive assembly coupled to the support frame for vibrating the support frame and the deck. The asymmetric planetary drive assembly comprises a flywheel gearbox a planetary gear and at least one eccentric weight coupled to the planetary gear. The planetary gear comprises a central axis bore that receives a planetary gear shaft through a central hole in the planetary gear. The gearbox receives a main shaft through a central hole in the flywheel gearbox. The planetary gear shaft is offset from the main shaft. The eccentric weight is coupled to the planetary gear offset from the main shaft.

15 Claims, 15 Drawing Sheets

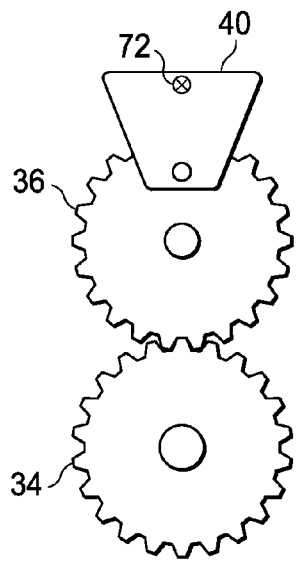
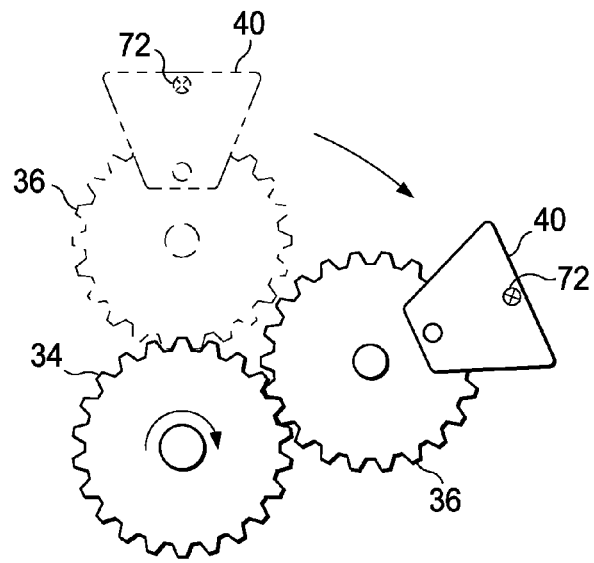
FIG. 8a    FIG. 8b
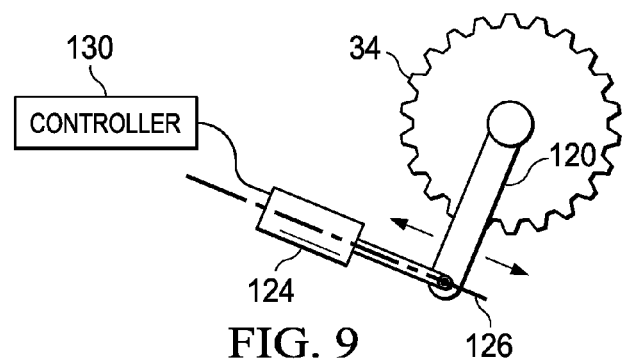
FIG. 9

ASYMMETRIC PLANETARY DRIVE ASSEMBLY FOR USE IN SHAKERS

CROSS-REFERENCE TO RELATED APPLICATION

The present application claims priority to U.S. Provisional Patent Application No. 61/331,196, filed on May 4, 2010 which is hereby incorporated herein by reference.

BACKGROUND

When drilling a well (e.g., for oil or gas), a drill bit is attached to the end of a drill string and drills a hole through rock to access the oil or gas reservoir. Drilling mud is used during drilling operations. Drilling fluid comprises, for example, a finely ground clay base material to which various chemicals and water are added to form a viscous fluid. This drilling mud is pumped down the hollow drill pipe, through the drill bit and returned to the surface in the annular space between the drill pipe and the well bore.

The drilling mud serves three main purposes. First, it aids in cooling the drill bit and thereby increasing its useful life. Second, the mud flushes the cuttings or "solids" from the well bore and returns them to the surface for processing by a solid control system. Third, the mud leaves a thin layer of the finely ground clay base material along the well bore walls which helps prevents caving in of the well bore wall.

Although often referred to simply as "mud", the drilling mud is a complex composition which must be carefully engineered and tailored to each individual well and drilling operation. Thus the drilling fluid is costly and thus is cleaned and reused in a closed loop system in which a solid control system and a shaker play important roles.

A shaker, often referred to as a "shale shaker," is part of a solids control system used in oil and gas drilling operations to separate the solid material ("solids"), removed from the well bore by the drilling operation, from the drilling mud. In order for the drilling fluid to be used and reused it must be processed after returning from the well bore to remove the aforementioned solids and maintain its proper density, often expressed as pounds per gallon or "mud weight", i.e., 10 lb./gal. mud or "10 lb. mud". The first step in processing the returned drilling fluid is to pass it through a shaker with a screen. The vibrating action of the screen over which the mud passes removes larger particle size solids (e.g., in the 200 to 700 micron size range) while allowing the drilling fluid and smaller particle size solids to pass through the screen.

Solids, which are discarded from the top of the shaker screen, discharge into a pit or onto a conveyor and the underflow drilling fluid flows into the tank below. The drilling fluid in the tank (which still includes smaller size particles in the mud) is stirred with an agitator before being pumped to additional solids control equipment known as desanders and desilters. The desander removes abrasive solid particles smaller in size than what the shaker screens remove. The desilter then removes solids at even smaller sizes still. At this point the underflow from the desander and desilter, which is mostly solids with a small amount of drilling fluid is then sent to a third shaker referred to as a drying shaker or mud cleaner. This shaker has a very fine screen to allow the drying of the removed solids and recapture of as much of the costly drilling fluid as possible. The drilling fluid is then processed through a centrifuge to remove solids down to very small sizes (e.g., 2 microns) before being recirculated into the well bore.

The present disclosure relates to the shale shaker. A shaker includes a support frame of some sort on which a vibrating assembly is driven with a motor. The vibrating motion of the vibrating assembly causes the support frame and thus the screens to vibrate.

One type of shaker is known as a "circular motion" shaker in which the excitation force comes from the centrifugal force generated by a rotating eccentric weight driven by a single motor. Circular motion shakers generally require the screen deck to be angled downward in the desired direction of mud flow in order to achieve sufficient mud flow across the screens. This downward angle unfortunately limits the screen mesh size to coarser screen meshes in order to maintain a minimal flow rate. Too fine a mesh and the mud will simply flow downhill and off the discharge end, before the affluent has a chance to conduct through the fine mesh screen. Such shakers generally require lower capital cost and achieve higher screen life due to lower peak G-forces. However, such shakers are limited to coarser screen meshes, have limited or no deck angle adjustment due to required downward sloping deck angle, have relatively poor solids conveyance, have lower peak G-force, and experience generally sub-standard overall performance.

A linear motion shaker includes two identical vibrator motors driven at the same speed but the eccentric weights associated with each motor rotate in opposite directions. This results in more linear excitation profile and thus maximum G-force is generated generally along a single axis. Because of the linear nature of the vibration profile, a linear motion shaker can "aim" the axis of excitation by adjusting the angle of the vibratory motor assemblies thereby achieving desired solids conveyance characteristics regardless of deck angle. The deck angle then can be adjusted to speed up or slow down solids conveyance depending on the prevailing conditions. Further, a wider range of screen mesh sizes can be used and the deck angle can be adjusted to "tune" for the desired balance between optimum solids conveyance and maximum flow rate handling. Relatively high G-forces achievable by linear motion shakers unfortunately result in shorter screen life.

Balanced elliptical motion shakers detune the sharp focus of the linear shaker to produce a softer and gentler ovoid motion. As long as the width of the ovoid motion is not stretched so far as to approximate circular motion, balanced elliptical motion shakers can retain most of the performance characteristics of linear motion shakers, while extending screen life. The added lateral motion may also help clear the screen surface of pluggage caused by sticky reactive clay. Balanced elliptical shakers result in reduced peak G-forces, increased solids contact time with the screens and decreased solids conveyance efficiency. Balanced elliptical shakers have relatively high capital cost.

FIG. 1 illustrates the relative motions of linear, balanced elliptical, and circular motion shakers.

The shakers described above are all driven by vibrator motors that comprise an eccentric mass that rotates at a constant distance from the center of rotation. The mass also rotates at a constant angular velocity matched to the rotational speed of the motor. Further, the motion is balanced about both the axis of rotation and the plane normal to the axis of rotation. All such shakers lack true "lateral motion," each having only varying widths in their elliptical orbits. None of these shakers simultaneously optimizes all of the performance characteristics including peak G-force, solids conveyance, screen contact time, screen self-cleaning and screen life. For example, increasing the eccentric weight in a linear motion shaker increases peak G-force and solids conveyance but decreases screen contact time and screen life. Increasing the elliptical path of elliptical motion shakers increase screen contact time and screen life but at the detriment of peak G-force and solids conveyance.

BRIEF DESCRIPTION OF THE DRAWINGS

For a detailed description of exemplary embodiments of the invention, reference will now be made to the accompanying drawings in which:

FIGS. 8A and 8B illustrate two different configurations for the apex point of the eccentric weight;

FIG. 9 shows an embodiment in which an actuator is used to move the control arm;

FIG. 14b illustrates that with multiple asymmetric planetary drive assemblies, such assemblies can be tuned to avoid the rocking motion of FIG. 14a.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
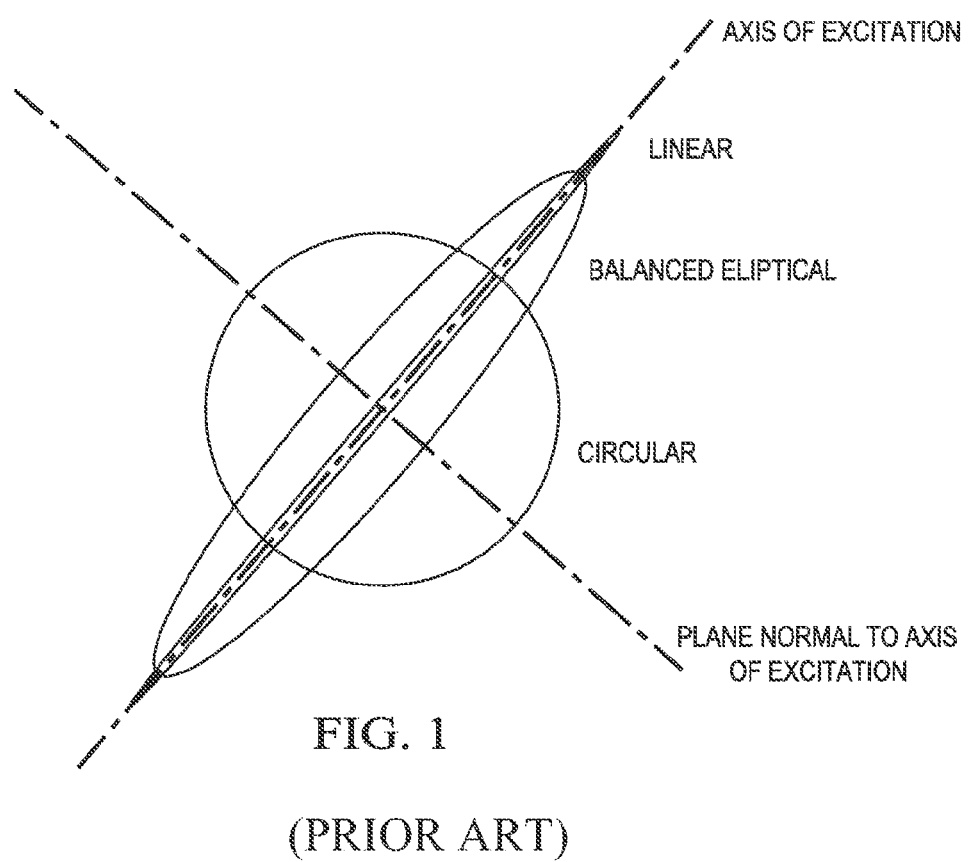
FIG. 1 illustrates the relative motions of linear, balanced elliptical, and circular motion shakers.
Figure 2:
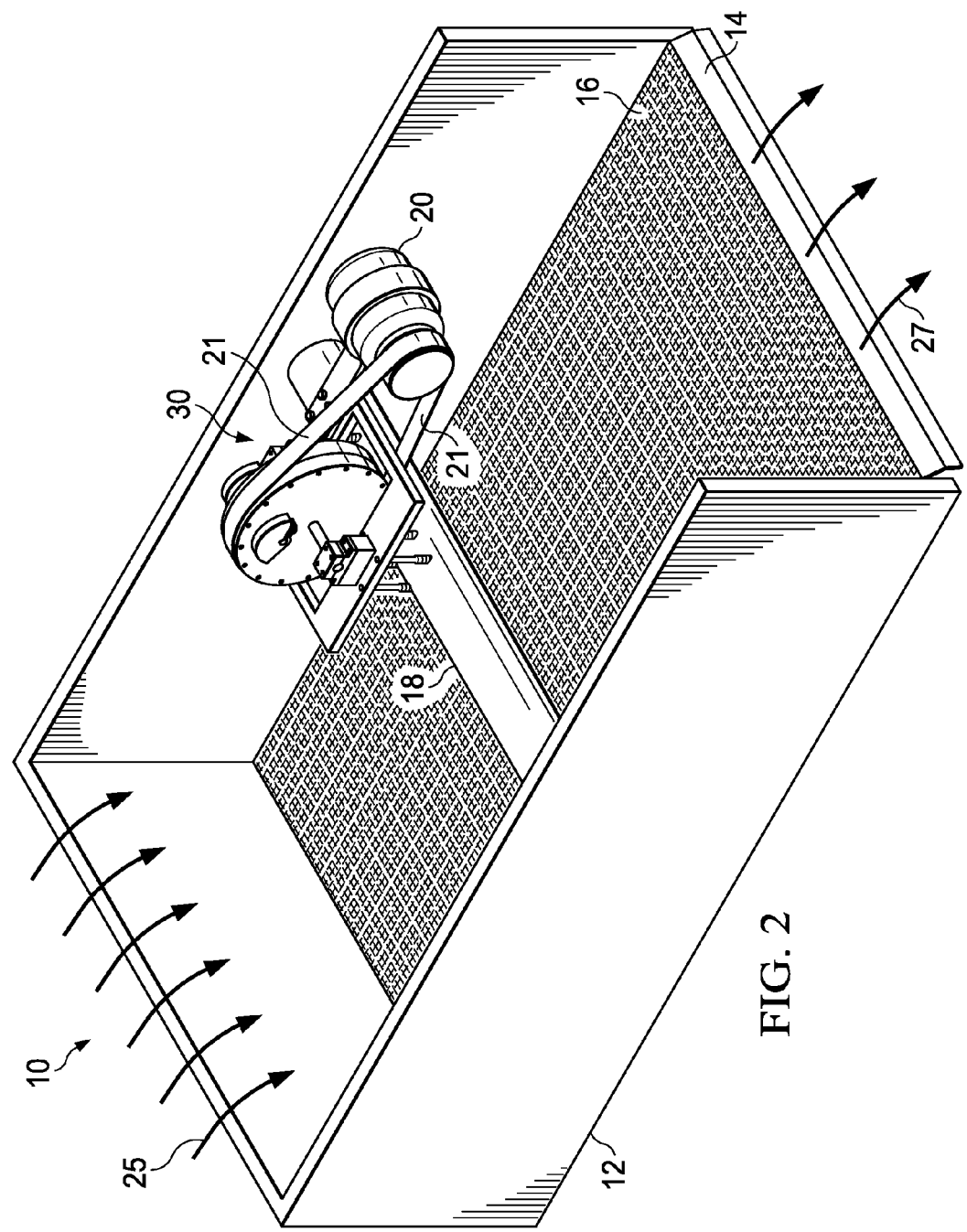
FIG. 2 shows a shaker comprising an asymmetric planetary drive assembly in accordance with various embodiments of the invention.

FIG. 2 shows an example of a shale shaker 10 in accordance with various embodiments of the invention. The shale shaker 10 preferably comprises a base 12 made from iron or other suitable material. The base 12 supports a deck 14 on which one more mud screens 16 reside. A drive motor 20 is shown supported on a support frame 18. The motor 20 is coupled to an asymmetric planetary drive assembly 30 by way of a belt 21. The asymmetric planetary drive assembly 30 also is supported on the support frame 18. The motor 20 cause the belt 21 to turn which, in turn causes the asymmetric planetary drive assembly 30 to operate thereby causing the support frame 18 to vibrate. The support frame 18 is rigidly attached to the base 12 and thus the screen deck 14, and consequently, the mud screens 16 vibrate as well. Mud is loaded onto the screens 16 at 25 and dry particles are separated from liquid by way of the vibratory action of the screens. The residual material exits the screens at 27.

Various embodiments of the asymmetric planetary drive assembly 30 are discussed herein. Common to all embodiments is the use of at least one planetary gear to which an eccentric weight is coupled. The planetary gear is housed in a flywheel gearbox and is offset from the central axis of the flywheel gearbox. The flywheel gearbox is caused to turn by the motor and the rotating action of the flywheel gearbox causes the planetary gear also to orbit about the flywheel gearbox's central axis. While the planetary gear moves in an orbit around the central axis of the flywheel gearbox, a structure contained within the flywheel gearbox also causes the planetary gear to rotate about the planetary gear's own axis. Various structures which cause the planetary gear to rotate about its own central axis as well as revolve around the flywheel gearbox's axis are shown in the figures and described below.

Figure 3:
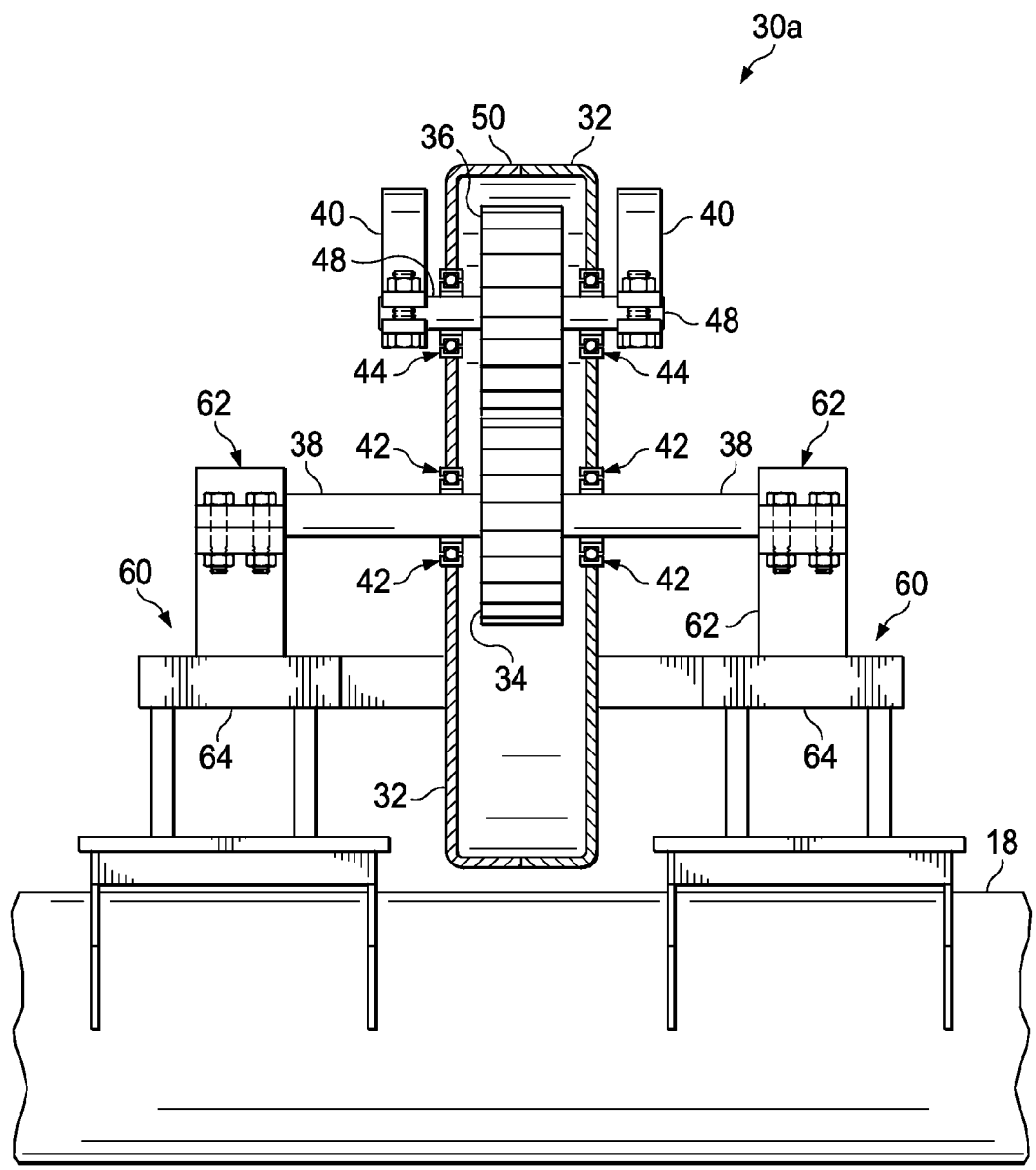
FIG. 3 shows one illustrative embodiment of a asymmetric planetary drive assembly comprising a sun gear.

FIG. 3 shows an illustrative embodiment of an asymmetric planetary drive assembly 30a. A front view is shown. The asymmetric planetary drive assembly 30a of FIG. 3 includes a flywheel gearbox 32 (shown partially cut-away) which contains a sun gear 34 and a planetary gear 36. The sun gear 34 has a central hole as does the flywheel gearbox 32. The sun gear 34 resides within the flywheel gearbox 32 in a centered position so that the central holes of the sun gear and flywheel gearbox are in alignment. A main shaft 38 is received through the central holes of both the sun gear 34 and flywheel gearbox 32. In at least some embodiments, the sun gear 34 is rigidly attached to the main shaft 38 and does not move relative to the shaft 38. The flywheel gearbox 32 is supported by main shaft 38 by bearings 42. As such, the flywheel gearbox 32 is able to rotate about main shaft 38.

The planetary gear 36 also has a central hole which receives a planetary gear shaft 48. The planetary gear shaft 48 is supported laterally through the sides of the flywheel gearbox 32 by bearings 44. As, the flywheel gearbox 32 rotates, the planetary gear shaft 48 is forced to move as well as in the direction of the flywheel gearbox rotation. Bearings 44 permit the planetary gear shaft 48 to rotate relative to the rotation of the flywheel gearbox 32.

One or more eccentric weights 40 are coupled to the planetary gear 36. As shown in FIG. 3, an eccentric weight 40 is provided on each side of the planetary gear 36 outside the flywheel gearbox 32.

The belt 21 (not shown in FIG. 2) turns by way of operation of motor 20. The belt 21 fits around the outer edge 50 of flywheel gearbox 32. The rotating belt thereby causes the flywheel gearbox 32 to rotate as well. Although the flywheel gearbox 32 rotates, the sun gear 34 does not rotate due to bearings 42 and the fact that the sun gear is rigidly attached to main shaft 38 which itself is attached (e.g., bolted) to support structure 60 which is fixed in place. Support structure 60 comprises a pair of upright members 62 to which the main shaft 38 is attached. The upright members 62 are attached and supported by a support platform 64 which contains a central slot for the lower portion of the flywheel gearbox 32. The support platform 64 is attached to the support frame 18.

The sun gear 34 and planetary gear 36 each have teeth that are meshed together as shown in FIG. 2. The rotating flywheel gearbox 32 causes the planetary gear 36 to revolve around sun gear 34 which is not able to rotate. As such, the planetary gear 36 revolves around the sun gear and also rotates around its own central axis. This motion is illustrated schematically in FIG. 4. The sun gear 34 is illustrated in the center of the diagram. The sun gear 34 remains stationary while the planetary gear 36 revolves around the sun gear due to the rotating motion of the flywheel gearbox 32. The planetary gear 36 is illustrated at four different positions during a single orbit around the sun gear. The center of gravity (CG) of the eccentric weight 40 is illustrated at 72. Dashed line 70 depicts the path that the CG of the eccentric weight 40 takes during one complete orbit about sun gear 34. The path is in the direction of arrows 75.

At position P1, the CG 72 of the eccentric weight 40 is farthest away from the center of the sun gear 34. This point is referred to as the "apex." As the planetary gear 40 moves from point P1 to point P2, the planetary gear rotates in place due to is interaction with sun gear 34. Thus, the eccentric weight 40 moves as well. At position P2, the orientation of the planetary gear 36 and its weight 40 is as shown. At P2, the planetary gear 36 has rotated by 90 degrees relative to P1.

At point P3, the planetary gear 36 has rotated about its axis by another 90 degrees from P2, and thus has rotated by 180 degrees relative to P1. However, the eccentric weight is at its closest point to the center of the sun gear 34. Continuing its orbit to position P4, the planetary gear 36 rotates another 90 degrees relative to P3 and as a result, the orientation of the planetary gear and the eccentric weight is as shown at P4. The orbit of the planetary gear 36 continues back to position P1 thereby completing one full orbit. In some embodiments, the gear ratio of the sun-to-planetary gears is 1:1 but can be other than 1:1 in other embodiments.

The instantaneous linear velocity of the eccentric weights 40 is not constant during an orbit of the planetary gear. At the apex (position P1), the instantaneous linear velocity of the eccentric weights 40 is maximum and at the opposite side (position P3), the instantaneous linear velocity is the lowest. At the apex (P1), the instantaneous linear velocity being at its highest produces the highest tangential acceleration thereby yielding the highest centrifugal force. As the eccentric weights 40 travel away from the apex, they begin to decelerate relative to the stationary sun gear 34, while the distance from the CG 72 of the planetary gear gradually collapses. At position P3 (180 degrees opposite the sun gear from the apex), the instantaneous linear velocity approaches zero, thus producing minimal centrifugal force. From there, the eccentric weights 40 begin to accelerate again as they approach the apex point at which point the cycle repeats.

Figure 5:
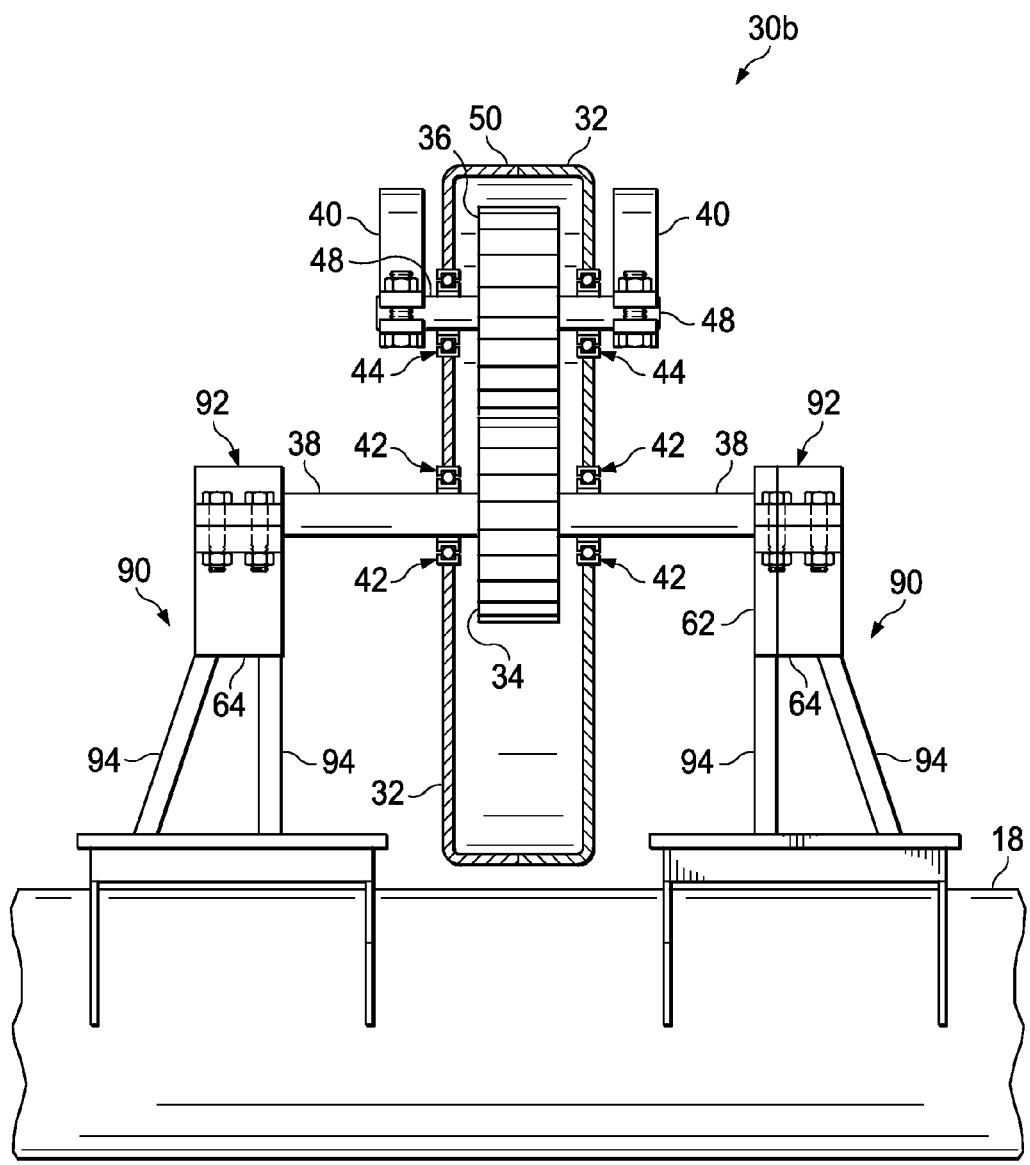
FIG. 5 shows another illustrative embodiment of a asymmetric planetary drive assembly.

FIG. 5 shows an alternative embodiment of an asymmetric planetary drive assembly 30b which is similar to assembly 30a of FIG. 3 with one exception. The support structure by which the asymmetric planetary drive assembly 30b is attached to and supported by support frame 18 is different. In FIG. 3, the asymmetric planetary drive assembly 30a was supported by a support platform 64 which itself was supported by the support frame 18. In the embodiment of FIG. 5, the main shaft 38 attaches (e.g., bolts) to a pair of couplings 92. Each coupling 92 is then attached to the support frame 18 by a pair of support struts 94 as shown. In some embodiments, the support struts 94 are threaded into corresponding holes in the support frame 18.

Figure 6A:
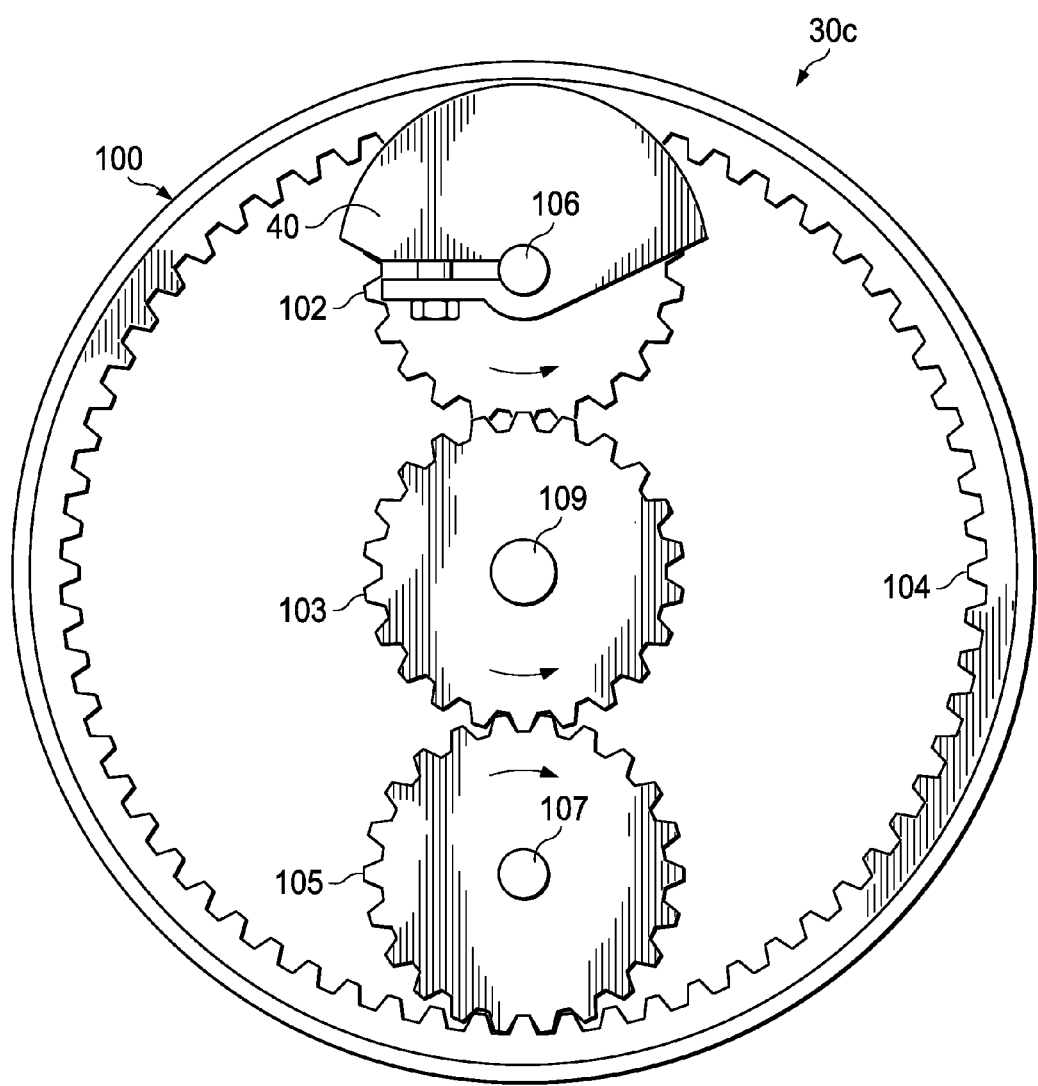
FIGS. 6a-6c shows yet another illustrative embodiment of a asymmetric planetary drive assembly comprising a ring gear.
Figure 6B:
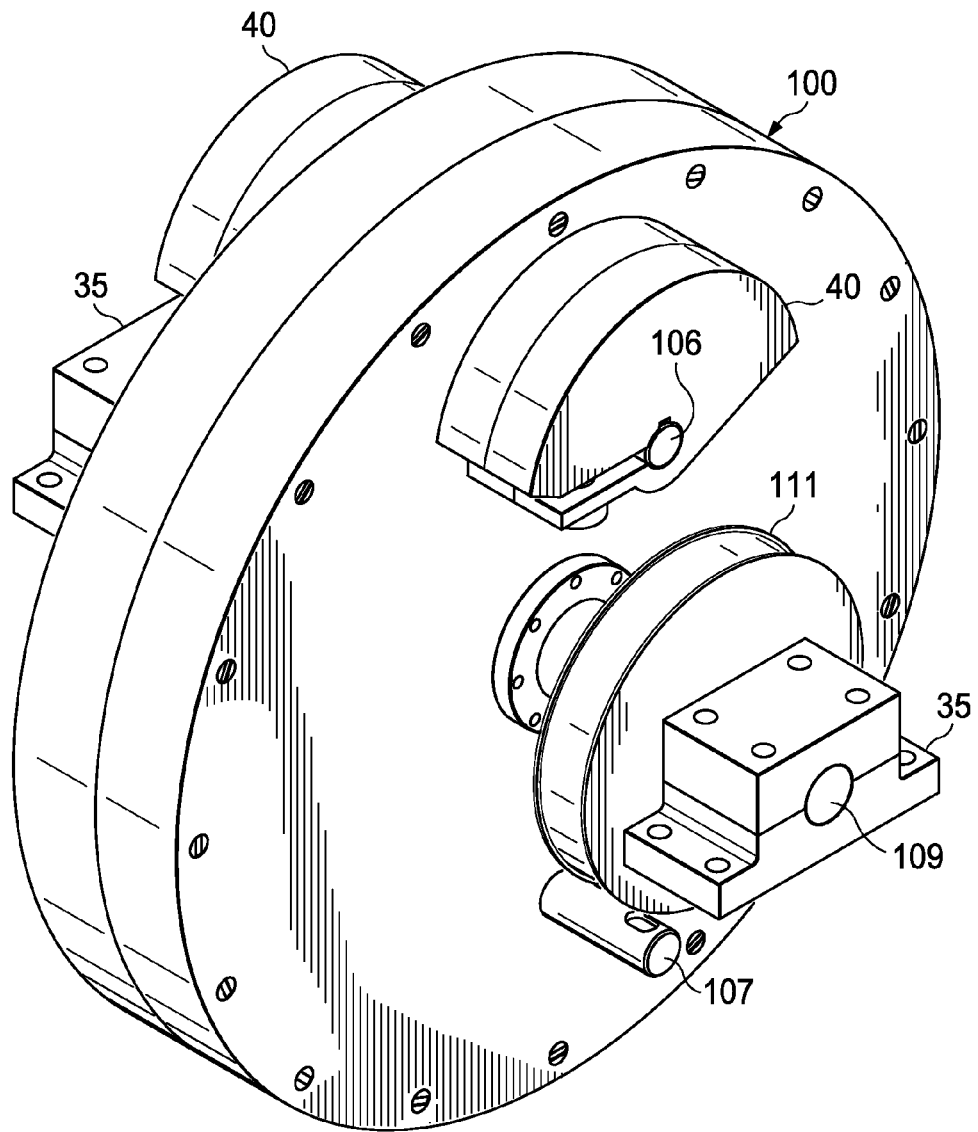
Figure 6C:
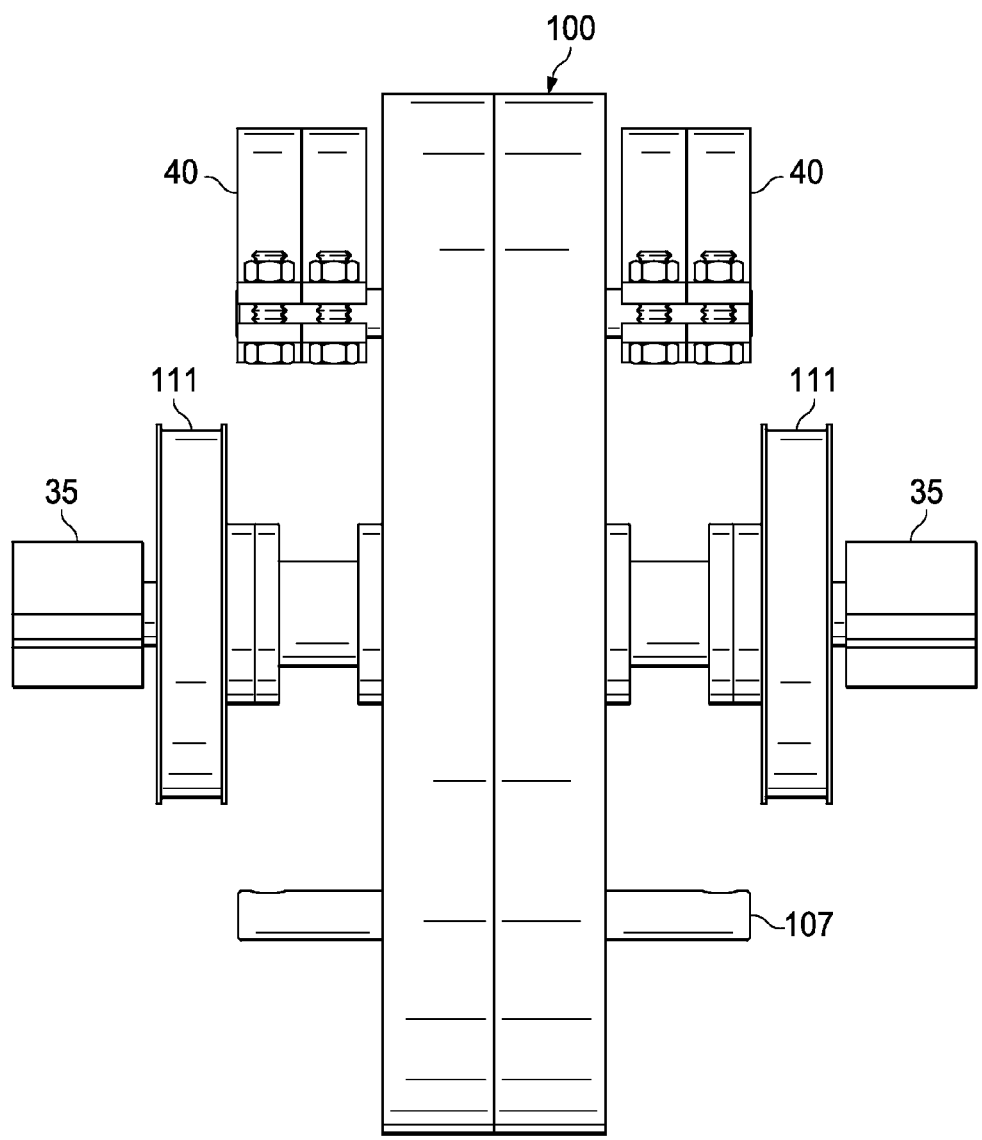

FIGS. 6a-6c illustrate yet another embodiment of an asymmetric planetary drive assembly 30c. This embodiment depicts a single drive unit with dual belt drive. The drive motor and belts, however, are shown in this figure. The embodiment shown in FIGS. 6a-6c illustrate a housing 100 that contains a sun gear 103, a planetary gear 102 to which eccentric weights 40 are coupled, and an intermediate gear 105. In the embodiment shown, no eccentric weights are attached to the intermediate gear 105. The sun gear is retained in place within the housing by shaft 109. Planetary gear 102 is retained in place within the housing by a shaft 106, and intermediate gear is retained in place by shaft 107. Each of the three gears is allowed to rotate freely about its shaft. A ring gear 104 is provided in the housing and engages the planetary and intermediate gears 102 and 105, but not the sun gear 103. A pair of pillow blocks 35 is provided on either side of the housing 100 and disposed on the sun gear's shaft 109. The shaft is able to freely rotate within pillow blocks 35. The pillow blocks 35 provide attachment points for attaching the drive assembly 30c the shaker bed. Also shown are a pair of pulleys 111 on either side of the housing 100 and disposed about planetary gear shaft 111. A motor drives belts which wrap around pulleys 111 and thereby cause the flywheel gearbox 100 to rotate as well.

The ring gear 104 comprises a ring with teeth that is disposed along or near the inner surface of the flywheel gearbox 100 and in some embodiments does not attach directly to housing 100. The teeth of the ring gear 104 face inward toward the center of rotation which is centered on planetary gear shaft 109. The ring gear's teeth engage the teeth of the planetary gear 102. The ring gear 104 also meshes with the intermediate gear 105 (which is positioned generally 180 degrees opposite the sun gear 103 from to the planetary gear 102), which is in turn driven by a sun gear. In this case, the sun gear 103 is not meshed with the planetary gear 102 but with the intermediate gear 105 instead. In this case, the sun gear 103 is also driven—directly or indirectly—by the housing 100 to rotate in the same direction but at twice the angular velocity as the housing 100. As the intermediate gear 105 is carried by the housing 100 to orbit around the sun gear's shaft 109, it is also compelled by the sun gear 103 to rotate about its own axis (centered on shaft 107). If the sun gear 103 and intermediate gear 1050 have a 1:1 gear ratio, the intermediate gear 105 will achieve the effect of "walking" about the ring gear at precisely the velocity to keep the ring gear in a stationary position. The rotation of the flywheel gearbox 100 causes the planetary gear 102 to move along a circular orbit 112 about center of rotation point 110. The teeth of the planetary gear 102 are enmeshed with the teeth of the ring gear 104, which is stationary, thereby causing the planetary gear to rotate about its own central axis as it moves through its orbit 112.

In FIGS. 6b and 6c, the flywheel gearbox 100 may contain the asymmetric planetary drive assembly (e.g., 30a FIG. 3) or a ring gear as in FIG. 6a depending on how the two drive sprockets are configured. In some embodiments, both sprockets are affixed to the flywheel gearbox and driven by the same motor. A pair of belts is wrapped around the pair of opposing pulleys 111 and driven by the same motor. In other embodiments, only one sprocket is affixed to the crankcase, whereas the other sprocket is affixed to a sun gear and driven at 2× flywheel gearbox speed. Such assemblies can be constructed as an asymmetric planetary assembly and a ring gear. For example, in FIG. 6c, the right-hand pulley/sprocket 111 may be affixed to the sun gear internal to the gearbox and the left-hand pulley 111 is affixed to the gearbox itself. A main drive motor includes a belt that wraps around the gear box thereby turning the gearbox. The resulting gear ratio may be 1:2. In yet other embodiments, one pulley 111 (e.g., left-hand pulley 111) is affixed to the sun gear and driven by a servo motor, which is position-controlled by an on-board computer to adjust directional bias through 360 degrees of rotation. The right-hand pulley 111 is affixed to the flywheel gearbox and driven by a separate drive motor.

Figure 4:
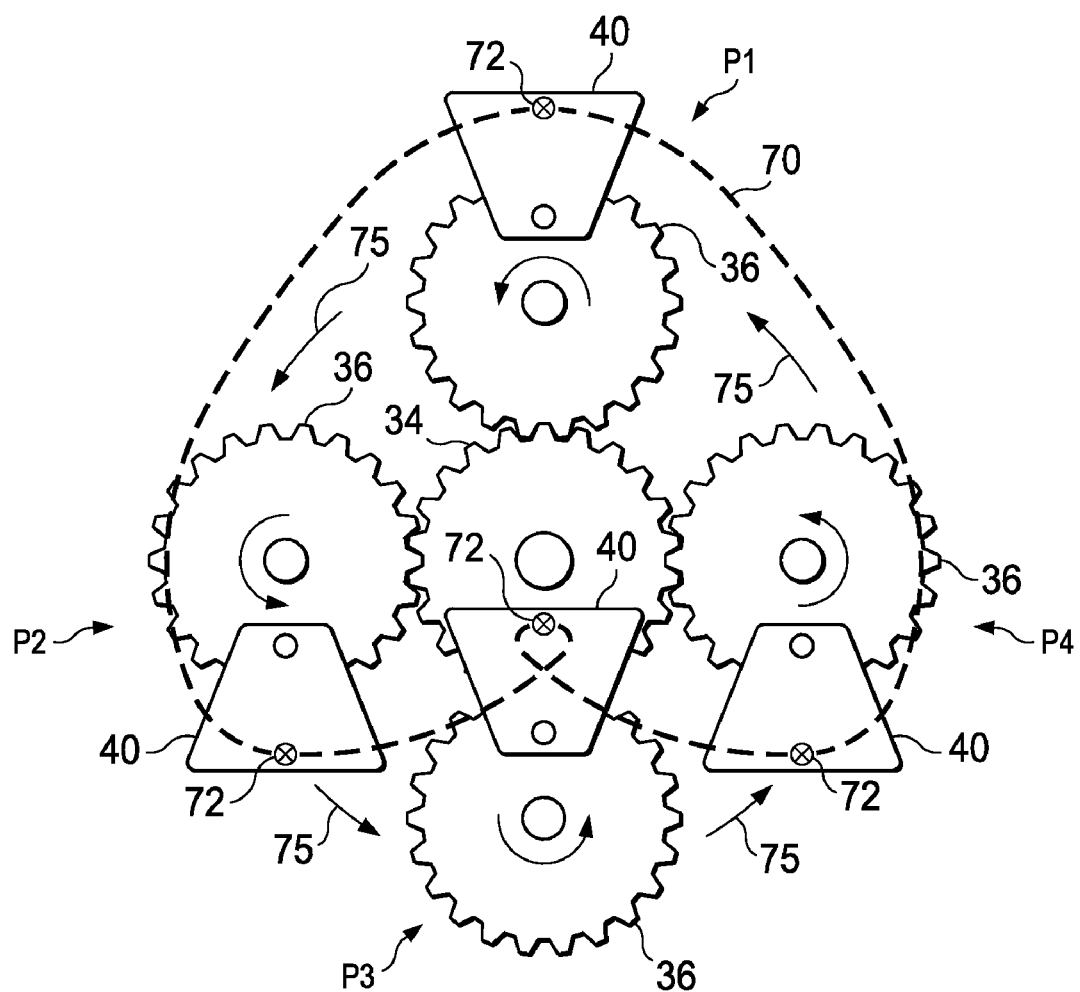
FIG. 4 illustrates the motion of the planetary gear in the asymmetric planetary drive assembly of FIG. 3.
Figure 7:
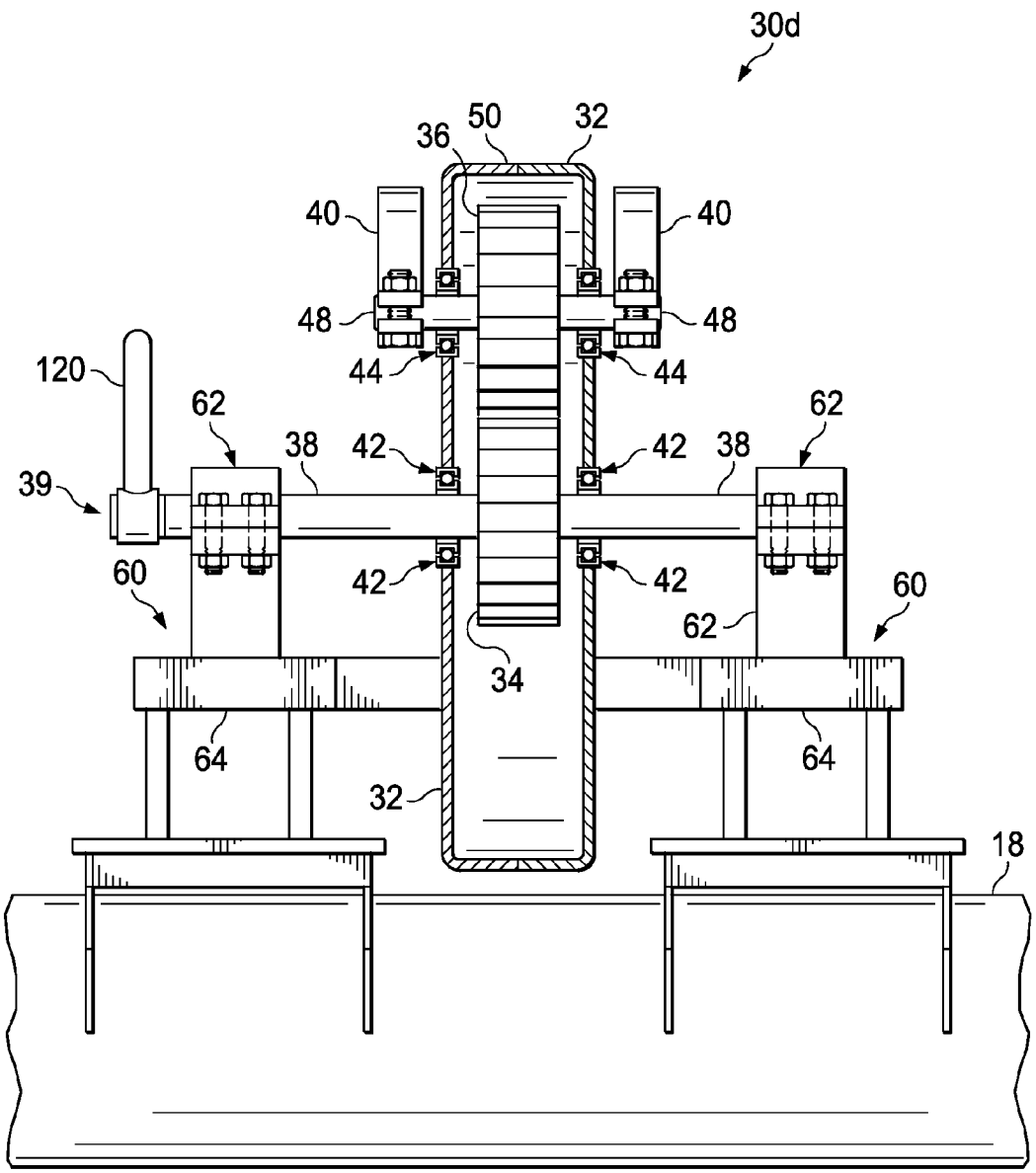
FIG. 7 shows an embodiment comprising a control arm to adjust the apex point of the eccentric weight.

As best illustrated in FIG. 4, the apex point for the eccentric weight is at point P1. It might be desirable to move the apex point P1 to a different location about sun gear 34. Varying the apex point P1 varies the directional bias of the excitation force, similar to changing the axis of excitation produced by a linear motion shaker. For example, the more the apex point P1 is canted towards the shaker discharge end, the greater the rate at which the solids will be conveyed on the screen surface. FIG. 7 illustrates an embodiment of an asymmetric planetary drive assembly 30d similar to 30a of FIG. 3. For asymmetric planetary drive assembly 30d, at least one end 39 of main shaft 38 is extended relative to the main shaft of FIG. 3. A control arm 120 is coupled to the main shaft 38 of FIG. 7. The control arm 120 comprises a handle that can be rotated in one direction or the other to turn the sun gear 34. By turning the sun gear 34 with the planetary gear 36 still engaged, the planetary gear rotates and starts to move along its orbit as well. By turning the sun gear, the apex point of the planetary gear's eccentric weight can be adjusted as desired as indicated by FIGS. 8a and 8b. In the example of FIG. 8b, the sun gear 34 has been rotated in the direction of the arrow which causes the planetary gear 34 to move in the opposite direction as shown.

In some embodiments, the main shaft 38 is loosened on its rigid supports in order for a person to manually turn the control arm 120.

FIG. 9 illustrates an embodiment in which an electro-mechanical actuator 124 is attached to the control arm 120. Via a signal from a controller 130 (e.g., a computer), the actuator 124 can be programmed to move linearly along axis 126 thereby moving the control arm 120 in one direction or the other.

Figure 15:
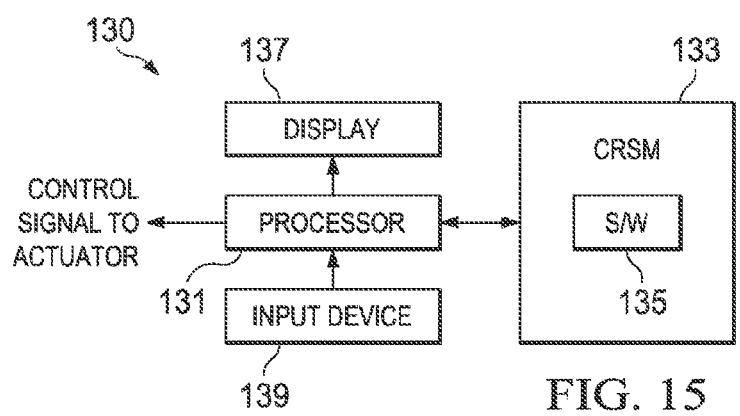
FIG. 15 illustrates an embodiment of a controller usable to dynamically adjust the directional bias angle of the shaker drive assembly and thus the shaker.

FIG. 15 shows an illustrative embodiment of a controller 130. As shown, controller 130 comprises a processor 131 coupled to a computer-readable storage medium (CRSM) 133, a display 137, and an input device 139. The CRSM 133 may comprise volatile storage such as random access memory (RAM), non-volatile storage (e.g., hard disk drive, Flash storage, CD ROM, read-only memory, etc.), or combinations thereof. Software 135 is stored on the CRSM and is executed by the processor 131 to provide the controller 130 with some or all of its functionality. The input device 139 may comprise a keyboard, mouse, touchpad, or any other type of input and/or pointing device.

In embodiments such as in FIG. 9, the directional bias angle of the shaker assembly is adjustable "on the fly" meaning dynamically while the shaker is actively vibrating and operating. The software 135 preferably implements a graphical user interface (GUI) via which a user of the controller 130 can interact with the controller. In some embodiments, the user is able to input, select, or otherwise specify a target directional bias angle for the drive assembly. The controller 130 reacts to the user-provided directional bias angle by causing the bias angle of the drive assembly to be altered by causing the electro-mechanical actuator 124 to cause the sun gear to be rotated as described above.

In at least some embodiments, a user can input via the GUI of the controller 130 a schedule of directional bias angles for the drive assembly to follow. For example, the user can specify that every X hours (e.g., every 4 hours) that the controller 130 should cause the drive assembly and shaker to enter a "self-cleaning" mode in which the directional bias angle is vertical (i.e., neither biased forward or to the rear). In some embodiments, the schedule includes one or more directional bias angles and a time (e.g., number of hours, time of day, etc.) associated with each such angle. The controller 130 executes the schedule thereby automatically (i.e., without human involvement) adjusting the bias angle per the schedule.

Figure 10:
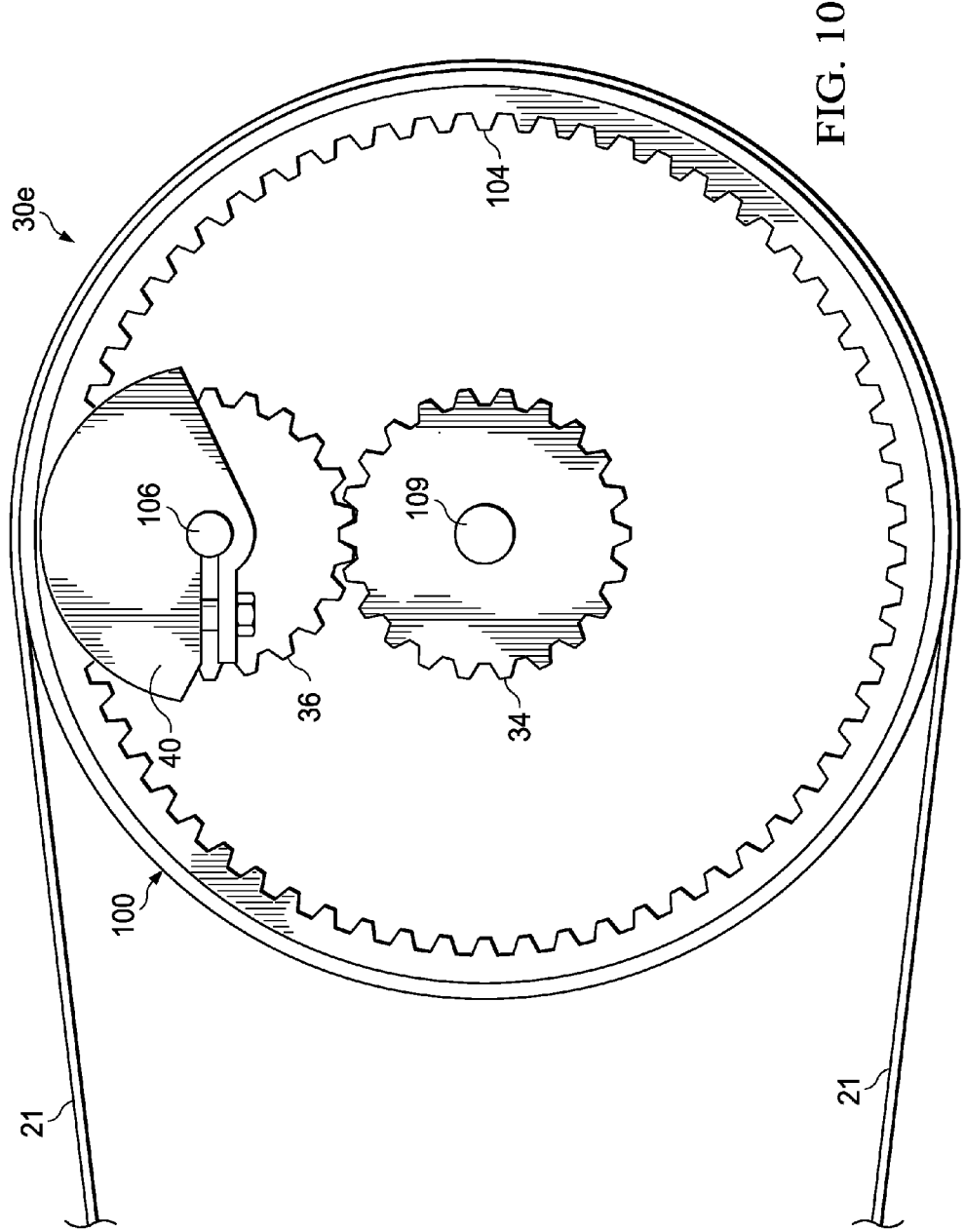
FIG. 10 illustrates an embodiment of a asymmetric planetary drive assembly comprising a planetary gear and both a sun gear and a ring gear.

FIG. 10 illustrates an embodiment of an asymmetric planetary drive assembly 30e in which the flywheel gearbox 100 contains both a ring gear 104 and a sun gear. The angular velocity differential between the ring and sun gears cause the planetary gear 36 to rotate about its axis as it moves about its orbit.

Figure 11:
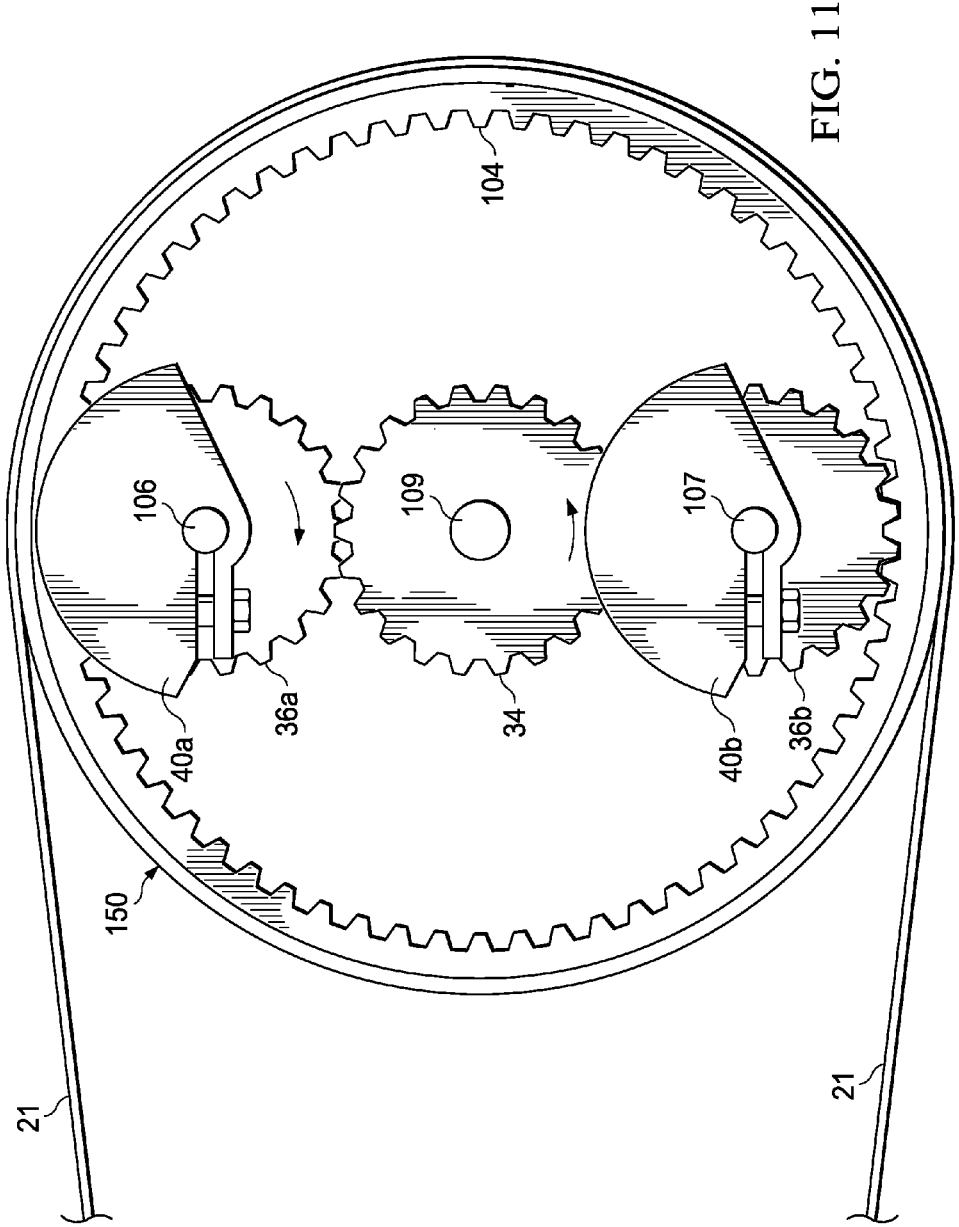
FIG. 11 illustrates an embodiment of a asymmetric planetary drive assembly comprising multiple planetary gears and a sun gear.
Figure 12:
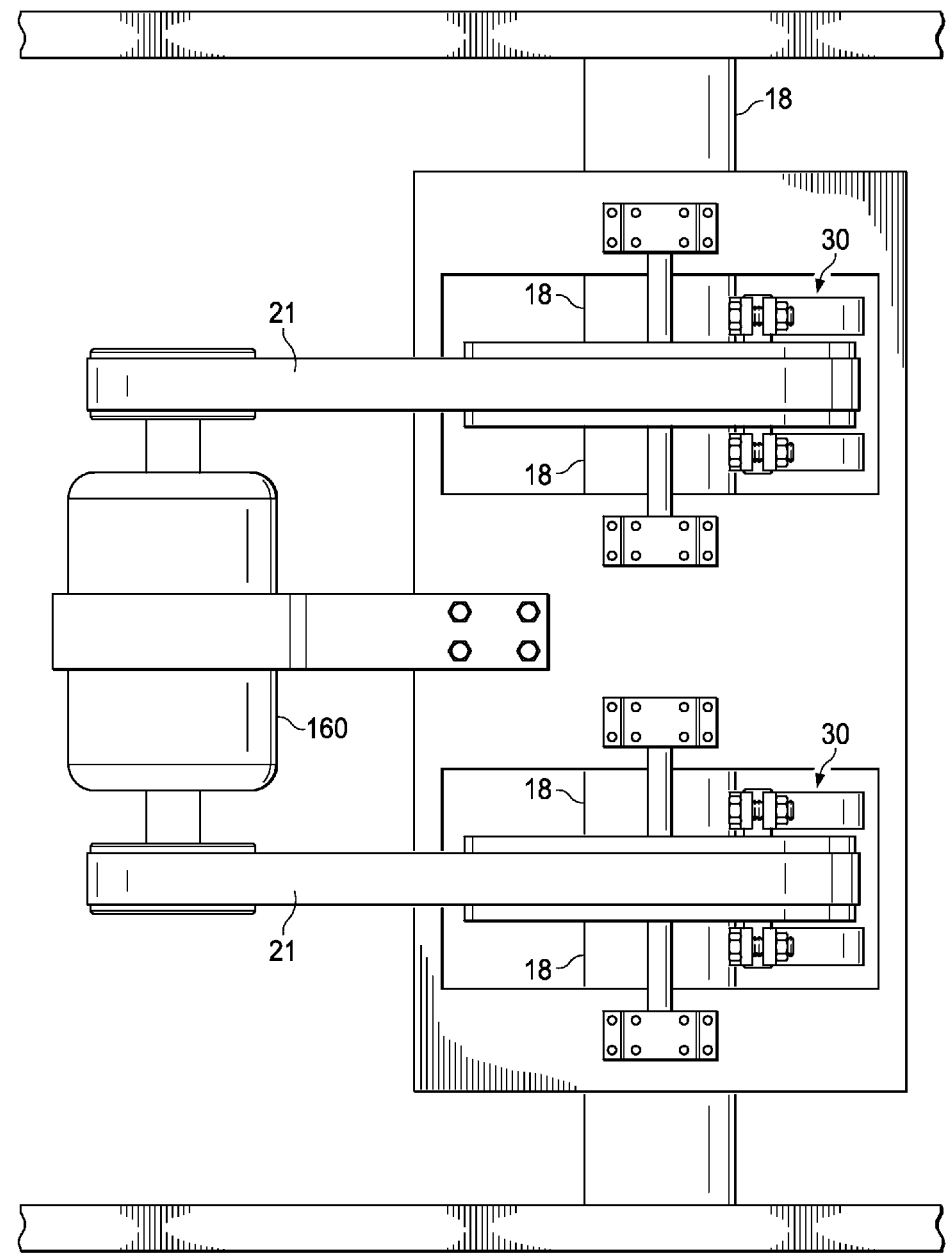
FIG. 12 shows an embodiment of a shaker in which a pair of side-by-side asymmetric planetary drive assemblies are driven by a common drive motor.

FIG. 11 illustrates an embodiment of an asymmetric planetary drive assembly 30e in which a flywheel gearbox 150 contains one sun gear 34 and a plurality of (e.g., 2) planetary gears 36a and 36b. In the embodiment of FIG. 12, the two planetary gears 36a and 36b are disposed on opposing sides of the sun gear 34. One more eccentric weights are coupled to each planetary gear. Thus, planetary gear 36a has eccentric weight(s) 40a and planetary gear 36a has eccentric weight(s) 40b. The apex points for the eccentric weights 40a, 40b are at opposite points along the orbit traversed by the planetary gears.

FIG. 12 shows a top view of the shaker. The embodiment of FIG. 1222 shows multiple (e.g., 2) asymmetric planetary drive assemblies 30 mounted on the support frame 18. A single dual shaft drive motor 160 is also provided to drive two separate belts 21. One belt 21 turns the flywheel gearbox of one asymmetric planetary drive assembly 30 and the other belt 21 drives the other asymmetric planetary drive assembly's flywheel gearbox. The two asymmetric planetary drive assemblies 30 in FIG. 13 sit side-by-side on the support frame 18.

Figure 13:
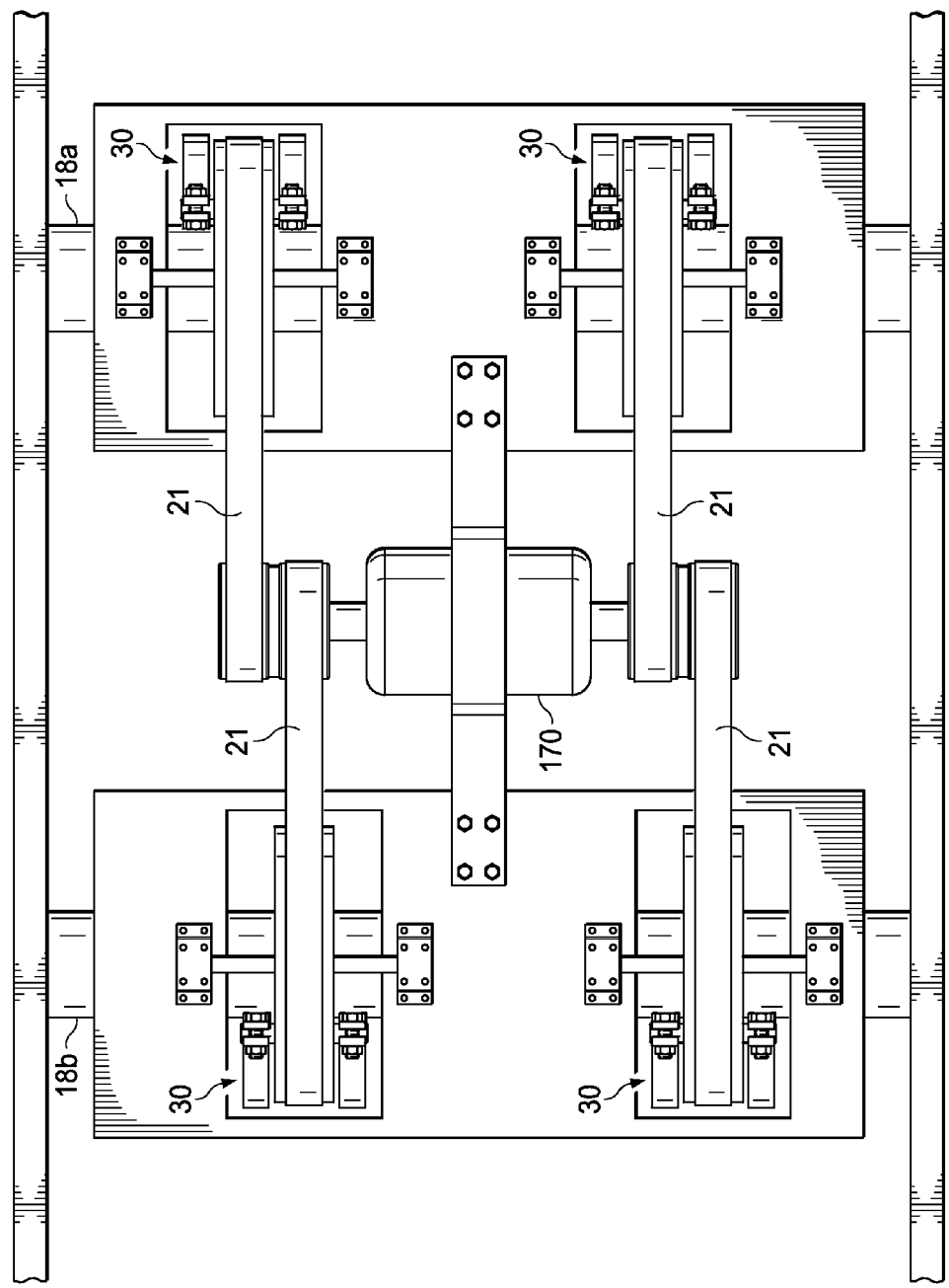
FIG. 13 shows an embodiment of a shaker in which a four asymmetric planetary drive assemblies are driven by a common drive motor.

FIG. 13 illustrates an embodiment in which four asymmetric planetary drive assemblies 30 are provided. One pair of asymmetric planetary drive assemblies 30 are provided on an aft support frame 18a and another pair of asymmetric planetary drive assemblies 30 are provided on a forward support frame 18a. A drive motor 170 is provided to which four belts 21 can be connected to drive the four asymmetric planetary drive assemblies 30.

Figure 14A:
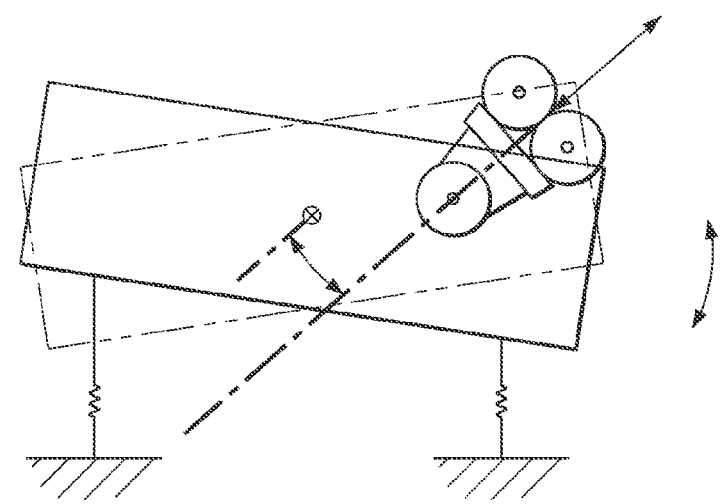
FIG. 14a depicts the undesirable rocking motion that may inflict some conventional types of shakers, if the axis of excitation does not go through the Center of Mass of the shaker suspended assembly.
Figure 14B:
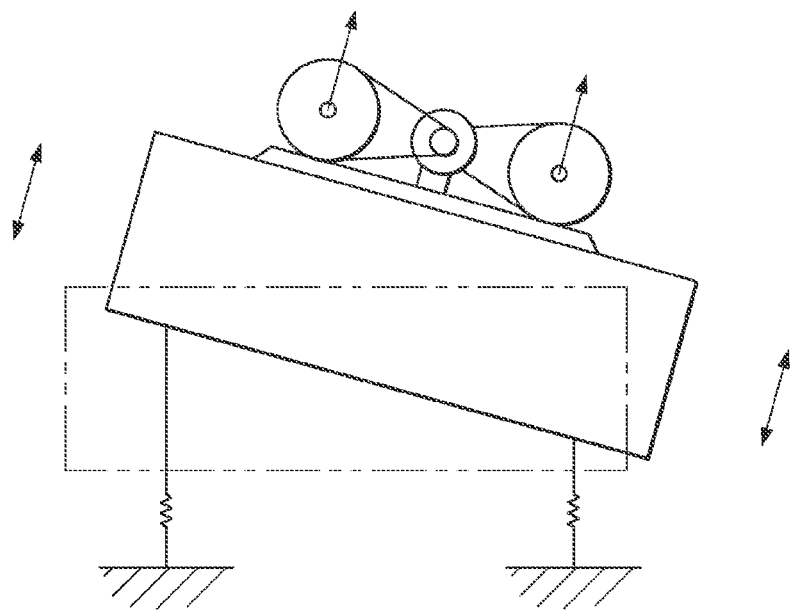

Multiple asymmetric planetary drive assemblies 30 can be tuned with dissimilar eccentric weight configurations for and aft to affect different excitation force profiles to suit different requirements from process material intake end to the solids discharge end. This effect can be achieved without inducing the undesirable second mode of vibration (i.e., fore and aft rocking motion). FIG. 14a illustrates the undesirable fore and aft rocking motion that may occur if a conventional vibrator is used. FIG. 14b illustrates the use of multiple, fore and aft, asymmetric planetary drive assemblies 30 of the preferred embodiment tuned to avoid the rocking motion.

Many conventional vibratory assemblies comprise a pair of oppositely rotating eccentric weights. In accordance with at least some of the preferred embodiments, the asymmetric planetary drive assemblies contain a single rotating pair of weights that rotate in the same direction. Conventional vibrator assemblies typically achieve directional bias via a pair of counter-rotating vibrator motors, having identical sets of eccentric weights. Synchronization between the two sets of eccentric weights require these two motors to be isolated from other external forces, so as to allow the forces produced by these two vibrator motors to interact with each other. Thus only one single pair of conventional vibrator motors can be mounted on the same spring-suspended vibratory assembly. In accordance with the preferred embodiments, some of the asymmetric planetary drive assemblies do not require isolation to produce a direction bias. This allows multiple APD assembles to be employed on the same spring-suspended vibratory assembly.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A shale shaker, comprising:
    a base;
    at least one deck coupled to said base, said at least one deck configured to support a mud screen;
    a support frame coupled to said base; and
    an asymmetric planetary drive assembly coupled to said support frame for vibrating said support frame and said at least one deck, said asymmetric planetary drive assembly comprising a flywheel gearbox, a sun gear having a central hole that also receives a main shaft of the gearbox, a planetary gear meshed to the sun gear, and at least one eccentric weight coupled to said planetary gear;
    wherein the planetary gear comprises a central axis bore that receives a planetary gear shaft through a central hole in the planetary gear, and said gearbox receives said main shaft through a central hole in the gearbox, and wherein said planetary gear shaft is offset from said main shaft;
    wherein said eccentric weight is coupled to said planetary gear offset from said main shaft; and
    wherein the gearbox rotates with respect to the main shaft but the sun gear is fixed to the main shaft and does not rotate with respect to the main shaft when the shale shaker is operating to filter process fluid.

2. The shale shaker of claim 1 further comprising an actuator or motor coupled to the sun gear, said actuator or motor causes said sun gear to rotate during an adjustment operation to adjust an apex location of the eccentric weight.

3. The shale shaker of claim 1 wherein the planetary gear assembly also comprises a ring gear, said ring gear is bound by mechanism(s) such that it does not rotate with respect to the main shaft.

4. The shale shaker of claim 1 wherein said gearbox also comprises a ring gear.

5. The shale shaker of claim 4 wherein said ring gear is fixed to the main shaft and does not rotate with respect to the main shaft.

6. The shale shaker of claim 1 wherein said gearbox houses a plurality of planetary gears.

7. The shale shaker of claim 1 wherein said gearbox houses a plurality of planetary gears meshed to a sun gear.

8. The shale shaker of claim 1 further comprising a motor that causes said gearbox to rotate.

9. The shale shaker of claim 8 further comprising a plurality of asymmetric planetary drive assemblies, each asymmetric planetary drive assembly comprising its own gearbox containing a planetary gear and an eccentric weight.

10. The shale shaker of claim 9 wherein said plurality of asymmetric planetary drive assemblies comprises two asymmetric planetary drive assemblies arranged side by side.

11. The shale shaker of claim 9 wherein said plurality of asymmetric planetary drive assemblies comprises two pairs of asymmetric planetary drive assemblies, each pair of asymmetric planetary drive assemblies arranged side by side, and one pair being distal of the other pair in the direction of mud flow across the shale shaker.

12. An asymmetric planetary drive assembly, comprising:
    a flywheel gearbox;
    a sun gear having a central hole that also receives a main shaft;
    a planetary gear disposed within said flywheel gearbox and meshed to the sun gear;
    an eccentric weight coupled to said planetary gear; and
    a ring gear meshed to the planetary gear bound by a mechanism such that it does not rotate with respect to the main shaft;
    wherein said planetary gear comprises a central axis bore that receives a planet gear shaft through a central hole in the planetary gear, and said gearbox receives the main shaft through a central hole in the gearbox, and wherein said planet gear shaft is offset from said main shaft; and
    wherein said eccentric weight is coupled to said planetary gear at a location offset from said main shaft.

13. The asymmetric planetary drive assembly of claim 12 wherein the gearbox rotates with respect to the main shaft but the sun gear is fixed to the main shaft and does not rotate with respect to the main shaft.

14. The asymmetric planetary drive assembly of claim 12 wherein said gearbox houses a plurality of planetary gears.

15. The asymmetric planetary drive assembly of claim 12 wherein said gearbox houses a plurality of planetary gears meshed to the sun gear.

* * * * *